(12) United States Patent
Maeda et al.

(10) Patent No.: US 7,239,059 B2
(45) Date of Patent: Jul. 3, 2007

(54) STATOR OF ROTATING ELECTRIC MACHINE AND MANUFACTURING METHOD OF THE STATOR

(75) Inventors: Naohide Maeda, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/137,377

(22) Filed: May 26, 2005

(65) Prior Publication Data

US 2005/0264123 A1    Dec. 1, 2005

(30) Foreign Application Priority Data

Jun. 1, 2004    (JP)    ............... 2004-162664

(51) Int. Cl.
*H02K 1/00*    (2006.01)
(52) U.S. Cl. ................. 310/180; 310/201; 310/208
(58) Field of Classification Search ........ 310/179–180, 310/184, 203, 208, 216
See application file for complete search history.

(56) References Cited

U.S. PATENT DOCUMENTS 3,566,171 A * 2/1971 Tichy et al. ............... 310/180
7,049,725 B2 * 5/2006 Blouin et al. .............. 310/216
2004/0020027 A1   2/2004 Shiah
2006/0066167 A1 * 3/2006 Saito et al. ................ 310/201

FOREIGN PATENT DOCUMENTS

| DE | 41 26 019 A1 | 2/1992 |
| DE | 199 61 760 A1 | 7/2001 |
| JP | 9 46940 A | 2/1997 |
| JP | 10-146030 A | 5/1998 |
| JP | 2000 41351 A | 2/2000 |

\* cited by examiner

*Primary Examiner*—Thanh Lam
(74) *Attorney, Agent, or Firm*—Sughrue Mion, PLLC (57) ABSTRACT

A plurality of coils concentratedly wound around individual teeth are formed as coil units having a common shape, each of the coil units being made by winding a conductor in a generally rectangular form, stacking one conductor line on top of another, and each of the coil units having two parallel straight portions inserted into the slots on both sides of each tooth. The two parallel straight portions of the conductor of each coil unit are fitted in two adjacent slots in such a way that one straight portion of the conductor is laid in an inner layer in one of the two adjacent slots and the other straight portion of the conductor is laid in an outer layer in the other of the two adjacent slots.

10 Claims, 6 Drawing Sheets

STATOR OF ROTATING ELECTRIC MACHINE AND MANUFACTURING METHOD OF THE STATOR

BACKGROUND OF THE INVENTION

1. Field of the Invention

The present invention relates to a stator of a rotating electric machine, such as an alternating current (AC) generator or an AC motor, in which coils are concentratedly wound on a plurality of teeth of a stator core.

2. Description of the Background Art

A concentrated-winding type stator of a rotating electric machine includes a stator core which is formed by stacking a plurality of core segments to a specified thickness and joining the core segments by pressure joining or welding and coils concentratedly wound in slots in the stator core. Each of the core segments has multiple teeth extending radially inward from a back yoke and slots formed between the adjacent teeth. These core segments are made by punching an electromagnetic steel sheet by a press, for instance.

Conventionally, a coil is wound around each tooth one layer on top of another by use of a winding machine which pays out a conductor through a nozzle while causing the nozzle to pass along slots between adjacent teeth. To ensure that the nozzle will not go into contact with any nearby coils during winding operation, it is necessary to make available a sufficient space between the nozzle and the nearby coils. This requirement however causes a decrease in space factor of winding in the slots, that is, the ratio of the cross-sectional area of the coil in each slot to the cross-sectional area of the slot, eventually leading to an increase in the size of the rotating electric machine.

A previously known approach to improving the space factor of winding is found in Japanese Patent Application Publication No. 1998-146030. In a first arrangement proposed in this Publication, two coils are wound in each slot, one coil in an inner layer and the other coil in an outer layer. In a second arrangement proposed in the Publication, each coil is wound in two adjacent slots in such a fashion that each coil is laid in an inner layer in a slot on one side of a tooth and in an outer layer in a slot on the other side of the tooth.

In the aforementioned first conventional arrangement in which two coils, or parallel straight portions of a pair of adjacent coils, are placed in the inner and outer layers of each slot, the coils in the inner and outer layers differ from each other in resistance, inductance and cooling efficiency. This could produce such problems as fluctuations in output torque and other output characteristics as well as acoustic noise.

In the aforementioned second conventional arrangement in which each coil is wound in the inner layer in the slot on one side of a tooth and in the outer layer in the adjacent slot on the other side of the tooth, the coils may be wound one after another such that a straight portion of one coil fitted in the outer layer lies on a straight portion of the adjacent coil fitted in the inner layer. This second arrangement however has a problem that it is extremely difficult to wind the last one of the coils. This is because when the last coil is wound, the outer layer of the last slot, in which a straight portion of the last coil is to be wound in the inner layer, is already occupied by a straight portion of the coil wound around the immediately adjacent tooth.

SUMMARY OF THE INVENTION

It is an object of the invention to provide a stator of a rotating electric machine featuring ease of coil assembly, a high space factor of coils in slots in a stator core and stable output characteristics, in which two concentratedly wound coils are fitted in each slot in such a manner that each coil is laid in an inner layer in one of two adjacent slots and in an outer layer in the other of the two adjacent slots. It is another object of the invention to provide a method of manufacturing such a stator of a rotating electric machine.

In one pricipal feature of the invention, a stator of a rotating electric machine includes a stator core including a cylinder-shaped back yoke, a plurality of teeth extending radially inward from inside the back yoke and a plurality of slots each formed between any two adjacent teeth, and a plurality of coils fitted in the slots such that the individual teeth are concentratedly wound by the coils. In the stator thus structured, the individual coils are formed as coil units having a common shape, each of the coil units being made by winding a conductor in a generally rectangular form, stacking one conductor line on top of another, and each of the coil units having two parallel straight portions inserted into the slots on both sides of each tooth. The two parallel straight portions of the conductor of each coil unit are fitted in two adjacent slots in such a way that one straight portion of the conductor is laid in an inner layer in one of the two adjacent slots and the other straight portion of the conductor is laid in an outer layer in the other of the two adjacent slots.

In another pricipal feature of the invention, a method of manufacturing the aforementioned stator of the invention includes the steps of producing each of the coil units by winding a conductor in a generally rectangular form, stacking one conductor line on top of another, in such a fashion that the conductor thus shaped has two parallel straight portions to be inserted into the slots on both sides of each tooth, producing the stator core stretched in a straight line by laminating a plurality of stator core segments made of electromagnetic steel sheets, each of the stator core segments having a linear-shaped back yoke portion and a plurality of tooth portions extending from the back yoke portion at right angles thereto, arranging the coil units in line such that one straight portion of the conductor of the coil unit to be wound on one tooth lies underneath one straight portion of the conductor of the one coil unit to be wound on one adjacent tooth, and the other straight portion of the conductor of the coil unit lies on top of one straight portion of the conductor of the coil unit to be wound on the other adjacent tooth, inserting the coil units thus arranged into the successive slots such that one straight portion of the conductor of each coil unit is laid in an inner layer in one of two adjacent slots and the other straight portion of the conductor is laid in an outer layer in the other of the two adjacent slots, shaping the stator core in which the coil units have been inserted into a cylindrical form such that end surfaces of the stator core initially stretched in a straight line are placed face to face with each other, and joining the facing end surfaces of the stator core to each other.

According to the stator of the rotating electric machine of the invention, it is possible to mount the coils in the stator core in a stable fashion with ease. Also, the aforementioned structure of the stator serves to improve the space factor of windings in the individual slots and thereby reduce the size of the rotating electric machine. In addition, since all of the coils have the same shape, the stator of the invention provides stable output characteristics.

According to the aforementioned method of manufacturing the stator of the invention, it is possible to produce the coil units and the stator core at the same time, thereby reducing overall manufacturing time.

Furthermore, since the coil units are inserted into the successive slots with the stator core stretched in a straight line, it is possible to easily fit and assemble the coil units made of thicker conductors in the stator core without causing damage to the coil units. This also makes it possible to improve the space factor of windings in the individual slots.

The rotating electric machine including the concentrated-winding type stator of the invention can be used as an AC generator or an AC motor in a motor vehicle, for example.

These and other objects, features and advantages of the invention will become more apparent upon reading the following detailed description along with the accompanying drawings.

DETAILED DESCRIPTION OF THE PREFERRED EMBODIMENTS OF THE INVENTION

First Embodiment

Figure 1:
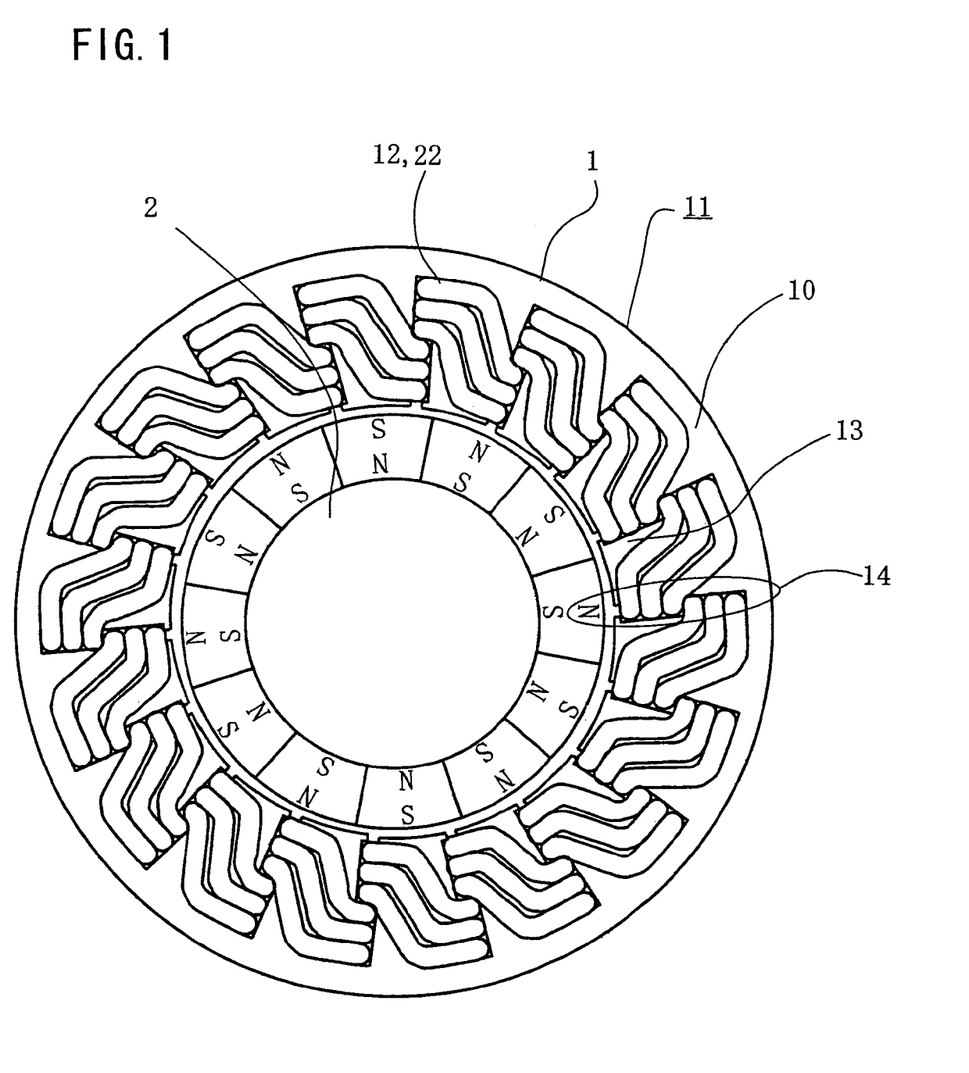
FIG. 1 is a cross-sectional diagram of a rotating electric machine according to a first embodiment of the invention.
Figure 2A:
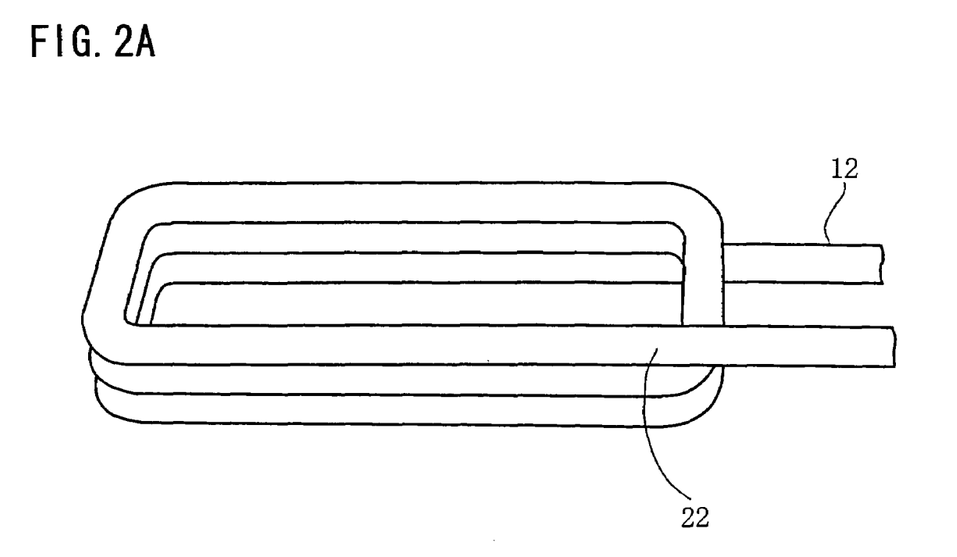
FIGS. 2A and 2B are a perspective diagram showing the shape of each coil unit fitted into a stator of the rotating electric machine of the first embodiment and a cross-sectional diagram showing how multiple coil units are fitted into the stator, respectively.
Figure 2B:
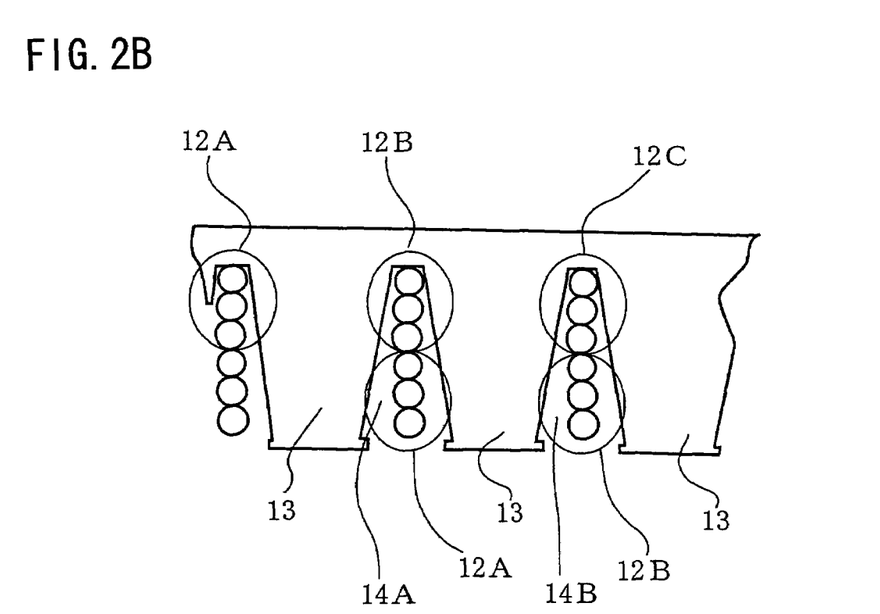

FIG. 1 is a cross-sectional diagram of a rotating electric machine according to a first embodiment of the invention. FIG. 2A is a perspective diagram showing the shape of each coil unit 12 assembled into a stator 1 of the rotating electric machine of the first embodiment, and FIG. 2B is a cross-sectional diagram showing how a plurality of coil units 12 are fitted.

Referring to FIG. 1, the rotating electric machine includes the aforementioned stator 1 which serves as an armature (or an assembly including main current-carrying conductors), a rotor 2 which serves as a field-generating assembly, and a bracket (not shown) in which the stator 1 and the rotor 2 are held on a common axis.

The stator 1 surrounding the rotor 2 includes a stator core 11 and the aforementioned coil units 12. The stator core 11 is built up by laminating a plurality of thin electromagnetic steel sheets to a thickness needed, in which layers of the electromagnetic steel sheets are joined together by pressure joining or welding to maintain the sheets in a laminated form.

The stator core 11 includes a cylinder-shaped back yoke 10, a plurality of teeth 13 extending radially inward from inside the back yoke 10, and a plurality of slots 14 each formed between any two adjacent teeth 13. The coil units 12 are fitted in the stator core 11 such that each coil unit 12 surrounds one tooth 13 with straight portions of each coil unit 12 laid in the slots 14 on both sides of the tooth 13.

Each of the coil units 12 is made by winding a conductor 22 in a generally rectangular form, stacking one conductor line on top of another, as shown in FIG. 2A. Two parallel straight portions of the conductor 22 thus shaped are inserted into the slots 14 on both sides of each tooth 13. As many such coil units 12 as necessary for manufacturing the stator 1 are produced before assembly.

As the coil units 12 are inserted into the slots 14 formed in the stator core 11, the individual teeth 13 are concentratedly wound by the coil units 12 as depicted in FIG. 1. More specifically, the two parallel straight portions of the conductor 22 of each coil unit 12 preformed as shown in FIG. 2A are inserted into two adjacent slots 14 on both sides of one tooth 13 in such a manner that one straight portion of the conductor 22 is laid in an inner layer in the slot 14 on one side of the tooth 13 and the other straight portion of the conductor 22 is laid in an outer layer in the slot 14 on the opposite side of the tooth 13. When the coil units 12 are inserted into the slots 14 in this fashion, the straight portions of the conductors 22 of any two adjacent coil units 12 are fitted together in one slot 14, with the straight portions of the two adjacent coil units 12 laid one on top of another in the inner and outer layers in a radial direction.

To assemble the individual coil units 12 into the stator core 11 such that one straight portion of the conductor 22 of each coil unit 12 is laid in the inner layer in one slot 14 and the other straight portion of the conductor 22 is laid in the outer layer in the adjacent slot 14, the coil units 12 are fitted in the slots 14 as follows. For example, three adjacent coil units 12A, 12B, 12C shown in FIG. 2B are first arranged in such a way that one straight portion of the conductor 22 of the coil unit 12B to be wound on one tooth 13 (the middle tooth 13 as illustrated in FIG. 2B) would be laid in the inner layer in one slot 14A underneath one straight portion of the conductor 22 of the coil unit 12A to be wound on one adjacent tooth 13, and the other straight portion of the conductor 22 of the coil unit 12B would be laid in the outer layer in the adjacent slot 14B on top of one straight portion of the conductor 22 of the coil unit 12C to be wound on the other adjacent tooth 13. Then, the conductors 22 of the coil units 12A, 12B, 12C thus arranged are pushed into the successive slots 14. As the individual coil units 12 are forced into the successive slots 14 in this fashion, coil end portions of the conductors 22 located outside both axial ends of each slot 14 are deformed such that one straight portion of the conductor 22 of each coil unit 12 to be wound on one tooth 13 lies in the inner layer in the slot 14 on one side of the tooth 13 while the other straight portion of the conductor 22 of the coil unit 12 lies in the outer layer in the adjacent slot 14 on the opposite side of the tooth 13 as illustrated in FIG. 1.

According to the above-described first embodiment of the invention, each of the coil units 12 is formed by winding the conductor 22 in multiple turns in a generally rectangular form, stacking one conductor line on top of another. Before the individual coil units 12 are inserted into the slots 14, the coil units 12 are arranged in such a way that one straight portion of the conductor 22 of each coil unit 12 would be laid in the inner layer in one slot 14 and the other straight portion of the conductor 22 of the same coil unit 12 would be laid in the outer layer in the adjacent slot 14. Since the coil units 12 thus arranged are pushed into the slots 14 with the straight portions of the conductors 22 of each pair of adjacent coil units 12 laid one on top of another, it is possible to insert the coil units 12 into the successive slots 14 in an extremely stable fashion with ease. Also, as all of the coil units 12 have the same shape, there occurs no difference in resistance, inductance or cooling efficiency among the coil units 12. Thus, the aforementioned arrangement of the embodiment serves to decrease fluctuations in output torque and other output characteristics as well as acoustic noise.

As coil assembling operation is performed by fitting the coil units 12 preformed in a generally rectangular form into the slots 14 in the stator core 11, it is possible to make the diameter of each conductor 22 as close as possible to the width of each slot 14. This makes it possible to improve the space factor of windings in the slots 14 and, as a result, reduce the size of the rotating electric machine.

In the foregoing embodiment, the conductors 22 of the coil units 12 are fitted into the stator core 11 in such a manner that conductor lines lie one on top of another in each slot 14 opening in one radial direction at both axial ends of the stator core 11 where the coil end portions of the conductors 22 are exposed. This configuration of the embodiment serves to decrease conductor stacking height at the coil end portions which do not produce any effective work in the rotating electric machine. In addition, this configuration provides improved cooling performance by ensuring that all of the conductors 22 are exposed to flows of cooling air.

Second Embodiment

Figure 3A:
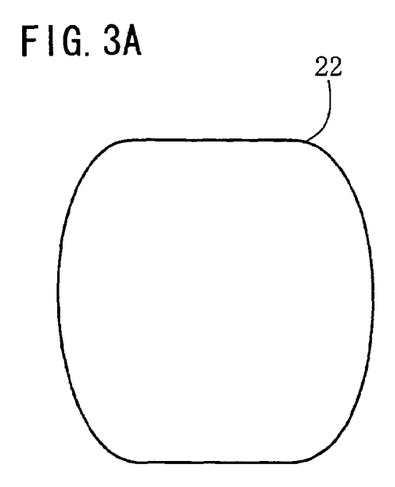
FIGS. 3A and 3B are cross-sectional diagrams of conductors used in a stator of a rotating electric machine according to a second embodiment of the invention.
Figure 3B:
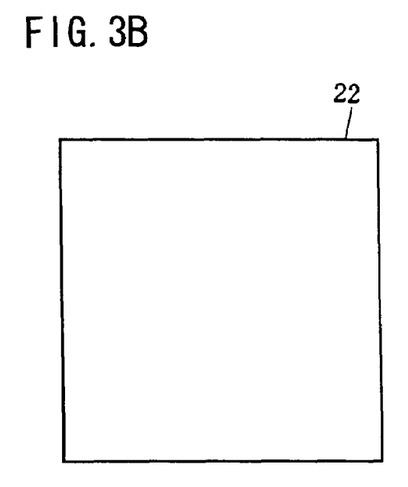

FIGS. 3A and 3B are cross-sectional diagrams of conductors 22 used in a stator 1 of a rotating electric machine according to two varied forms of a second embodiment of the invention. The conductor 22 shown in FIG. 3A has a slightly flat cross section having two flat surfaces, as if produced by flattening a round conductor from two opposite sides, whereas the conductor 22 shown in FIG. 3B has a square cross section having four flat surfaces.

If the coil unit 12 shown in FIG. 3A or 3B is used for producing individual coil units 12, it is possible to wind and stack successive turns of windings in such a manner that the flat surfaces of adjacent lines of the flat or square conductor 22 are placed face to face with each other. This arrangement serves to decrease a gap between one turn and the next of each conductor 22, making it possible to improve the space factor of windings in individual slots 14.

Third Embodiment

Figure 4:
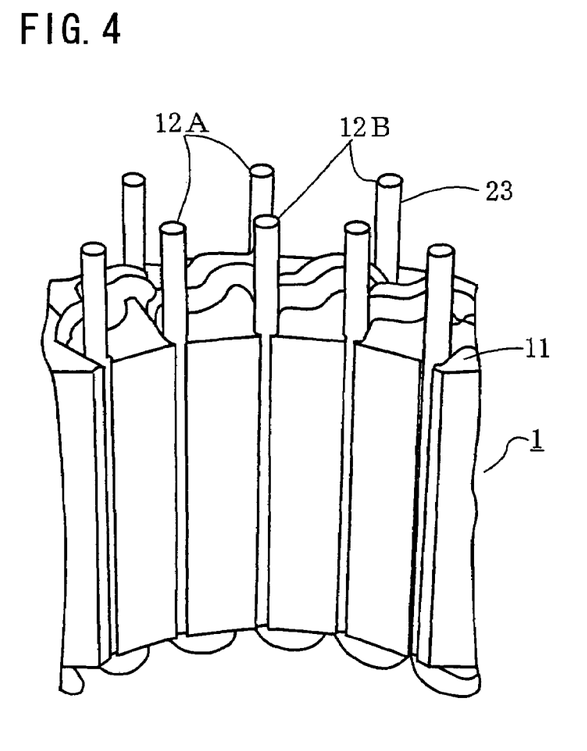
FIG. 4 is a fragmentary perspective view of a stator of a rotating electric machine according to a third embodiment of the invention.

FIG. 4 is a fragmentary perspective view of a stator 1 of a rotating electric machine according to a third embodiment of the invention, showing in particular a principal part of the stator 1.

In this embodiment, individual coil units 12 are fitted in a stator core 11 such that ends 23 of the coil units 12 are taken out of successive slots 14 from one axial end of the stator core 11 in a staggered form. Specifically, one outgoing end 23 of a coil unit 12A is taken out from an innermost layer in one slot 14 and the other outgoing end 23 of the coil unit 12A is taken out from an outermost layer in the adjacent slot 14 as illustrated in FIG. 4. Likewise, one outgoing end 23 of an adjacent coil unit 12B is taken out from an innermost layer in one slot 14 and the other outgoing end 23 of the coil unit 12B is taken out from an outermost layer in the adjacent slot 14.

Since the ends 23 of the individual coil units 12 serving as connecting parts thereof are concentrated at one axial end of the stator core 11 as described above, it is possible to eliminate losses in coil connecting operation.

Furthermore, since the opposite ends 23 of each coil unit 12 are separately taken out from the innermost and outermost layers of the adjacent slots 14, it is possible to prevent errors in coil connections.

Fourth Embodiment

Figure 5:
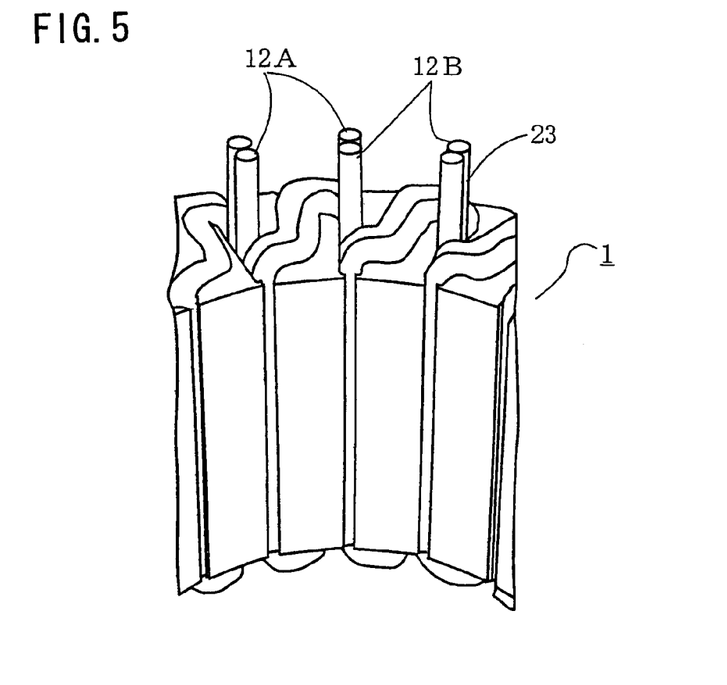
FIG. 5 is a fragmentary perspective view of a stator of a rotating electric machine according to a fourth embodiment of the invention.

FIG. 5 is a fragmentary perspective view of a stator 1 of a rotating electric machine according to a fourth embodiment of the invention, showing in particular a principal part of the stator 1.

In this embodiment, coil units 12 are fitted in a stator core 11 such that ends 23 of the individual coil units 12 are taken out of successive slots 14 from one axial end of the stator core 11. Specifically, the outgoing ends 23 of two adjacent coil units 12A, 12B are taken out from about the middle of inner and outer layers of each successive slot 14 as illustrated in FIG. 5.

Since the ends 23 of the individual coil units 12 serving as connecting parts thereof are concentrated at one axial end of the stator core 11 as described above, it is possible to eliminate losses in coil connecting operation.

Furthermore, since the opposite ends 23 of each coil unit 12 are taken out from about the middle between the inner and outer layers of each successive slot 14, it is possible to reduce space for accommodating coil connections.

Fifth Embodiment

Figure 6:
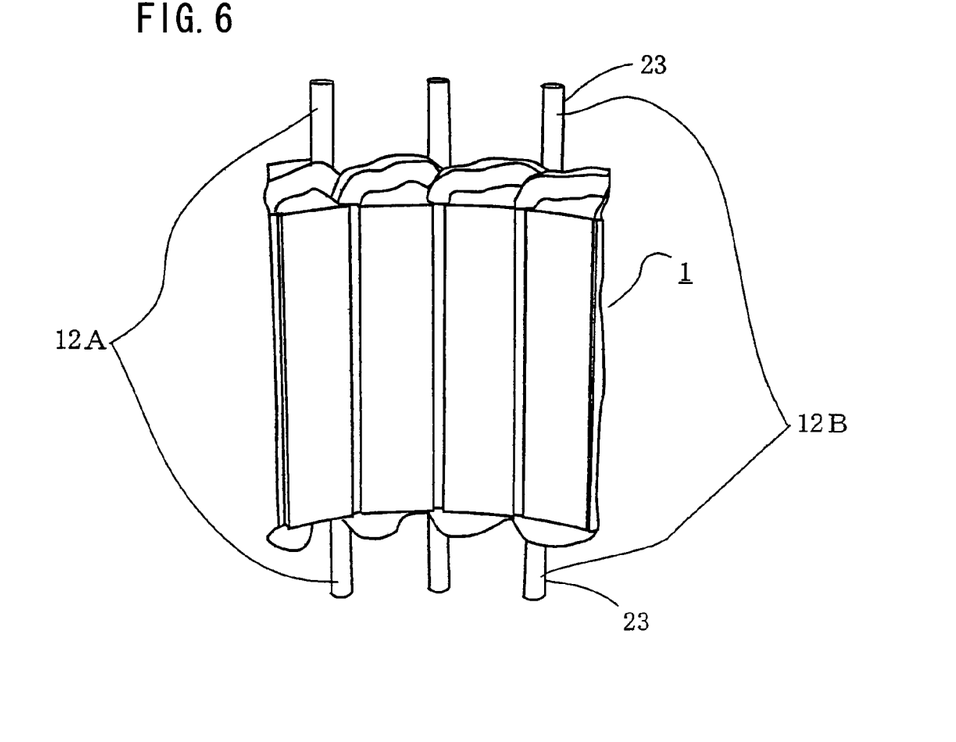
FIG. 6 is a fragmentary perspective view of a stator of a rotating electric machine according to a fifth embodiment of the invention.

FIG. 6 is a fragmentary perspective view of a stator 1 of a rotating electric machine according to a fifth embodiment of the invention, showing in particular a principal part of the stator 1.

In this embodiment, individual coil units 12 are fitted in a stator core 11 such that outgoing ends 23 of any coil units 12A, 12B are taken out of slots 14 from both axial ends of the stator core 11 as illustrated in FIG. 6.

Since the ends 23 of the coil units 12 are taken out of the slots 14 from the opposite ends of the stator core 11, connecting parts of the individual coil units 12 are divided into two groups. It is therefore possible to reduce space for accommodating coil connections at each axial end of the stator core 11.

Sixth Embodiment

Figure 7:
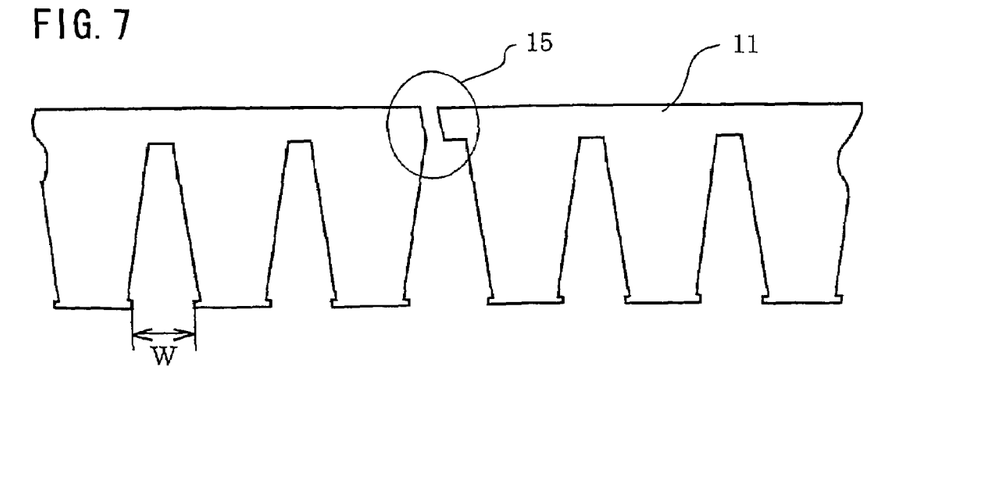
FIG. 7 is a cross-sectional view of a stator of a rotating electric machine according to a sixth embodiment of the invention.

FIG. 7 is a cross-sectional view of a stator 1 of a rotating electric machine according to a sixth embodiment of the invention, showing in particular a principal part of the stator 1.

A stator core 11 is cut by cut surfaces 15 and stretched in a straight line before coil assembly as shown in FIG. 7.

As the stator core 11 is cut by the cut surfaces 15 and stretched in a straight line as illustrated, there is formed an opening having a wide width W in each slot 14.

After individual coil units 12 are inserted into the slots 14, the stretched stator core 11 is shaped into a cylindrical form and the facing cut surfaces 15 are firmly joined to each other by welding, for instance.

According to the sixth embodiment, each slot 14 has the wide opening width W so that the coil units 12 made of thicker conductors 22 can be inserted into the slots 14 without causing damage to the coil units 12. This makes it possible to improve the space factor of windings in the individual slots 14.

Seventh Embodiment

Figure 8:
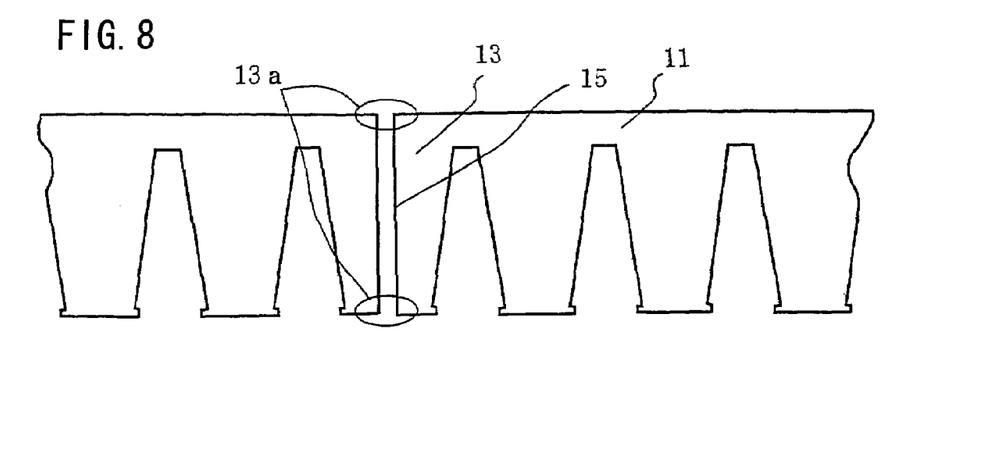
FIG. 8 is a cross-sectional view of a stator of a rotating electric machine according to a seventh embodiment of the invention.

FIG. 8 is a cross-sectional view of a stator 1 of a rotating electric machine according to a seventh embodiment of the invention, showing in particular a principal part of the stator 1.

A stator core 11 is cut by cut surfaces 15 and stretched in a straight line before coil assembly as shown in FIG. 8. In this embodiment, the cut surfaces 15 are formed in a tooth 13, as if by cutting the tooth 13 into two separate parts.

After individual coil units 12 are inserted into the slots 14, the stretched stator core 11 is shaped into a cylindrical form and the facing cut surfaces 15 are joined to each other by welding, for instance. Since the cut surfaces 15 are formed in one of the teeth 13, the facing cut surfaces 15 can be joined to each other by welding at two joint areas 13a located along inside and outside ends of the cut surfaces 15. This configuration of the embodiment makes it possible to produce the stator core 11 having an increased mechanical strength.

Eighth Embodiment

Figure 9:
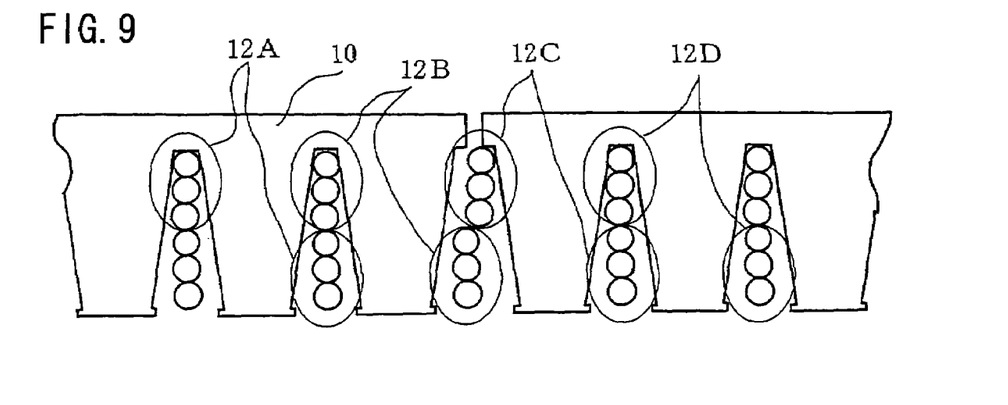
FIG. 9 is a cross-sectional view of a stator of a rotating electric machine according to an eighth embodiment of the invention.

FIG. 9 is a cross-sectional view of a stator 1 of a rotating electric machine according to an eighth embodiment of the invention, showing in particular a principal part of the stator 1.

In the aforementioned seventh embodiment shown in FIG. 8, the facing cut surfaces 15 are formed in one of the teeth 13, so that the coil unit 12 to be wound around the tooth 13 in which the cut surfaces 15 are formed must be fitted over the two separate parts of the tooth 13, straddling the facing cut surfaces 15. It is necessary in the seventh embodiment to mount the individual coil units 12 on the successive teeth 13 in such a way that the coil units 12 would be properly positioned in the slots 14 when the stator core 11 is shaped into a cylindrical form. This configuration of the seventh embodiment imposes some difficulties in coil assembling operation.

Intended to solve the aforementioned drawback of the seventh embodiment, the stator 1 of the eighth embodiment is configured as illustrated in FIG. 9. Specifically, facing cut surfaces 15 are formed on opposed sides of a back yoke 10 at the bottom of a slot 14. In this configuration, it is not necessary to fit any of adjacent coil units 12A, 12B, 12C, 12D to straddle the facing cut surfaces 15. Thus, the configuration of the eighth embodiment makes it possible to easily shape the stretched stator core 11 into a cylindrical form after mounting all of the coil units 12 on the successive teeth 13, thereby facilitating the coil assembling operation.

Ninth Embodiment

Figure 10:
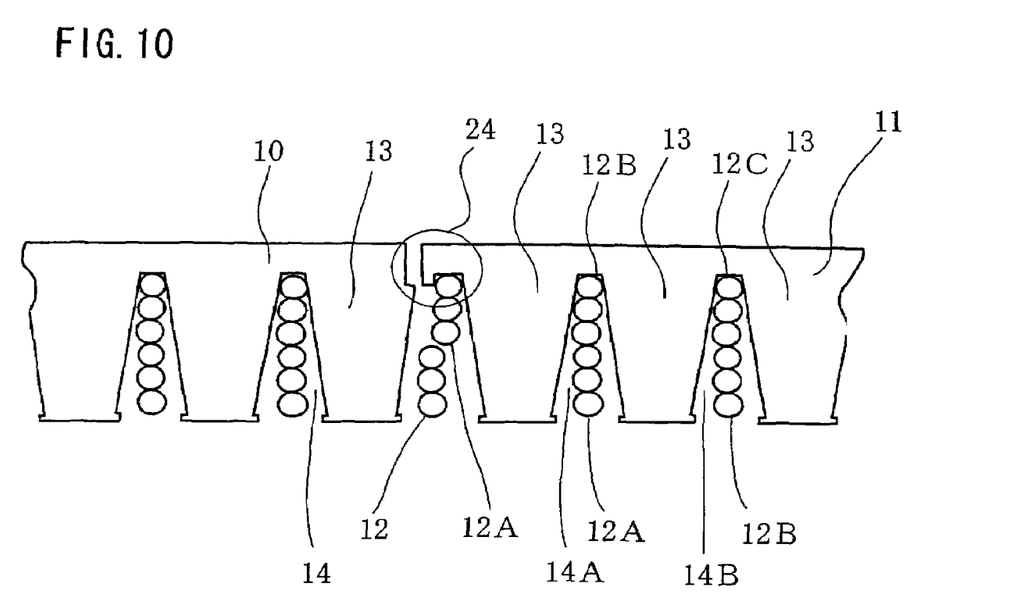
FIG. 10 is a cross-sectional view of a stator of a rotating electric machine according to a tenth embodiment of the invention.

FIG. 10 is a cross-sectional view of a stator 1 of a rotating electric machine according to a ninth embodiment of the invention, showing in particular a principal part of the stator 1.

A stator core 11 is cut by cut surfaces 15 and stretched in a straight line before coil assembly as shown in FIG. 10. The facing cut surfaces 15 are formed on opposed sides of a back yoke 10 from which multiple teeth 13 extend. Unlike the configuration of the aforementioned eighth embodiment of FIG. 9, the facing cut surfaces 15 are not formed immediately at the bottom of a slot 14 but at a location slightly offset from the middle of the bottom of the slot 14 in this embodiment. More particularly, one cut surface 15 is formed on one side of the back yoke 10 extending sideways from a basal part of one tooth 13, while the other cut surface 15 is formed on the opposite side of the back yoke 10 at a basal part of the adjacent tooth 13. In this configuration of the ninth embodiment, there is created a groove 24 at the bottom of the slot 14, so that an innermost conductor line of a coil unit 12A (as illustrated) fits in the groove 24.

As the facing cut surfaces 15 are formed between two adjacent teeth 13 in such a manner that the groove 24 into which the innermost conductor line of one coil unit 12 fits is created at the bottom of the slot 14, the innermost conductor line fits into the groove 24 and settles in position in a reliable fashion. As a result, it is possible to prevent displacement of the coil units 12 when shaping the stretched stator core 11 into a cylindrical form and thereby manufacture the stator core 11 in a more stable fashion.

Tenth Embodiment

A tenth embodiment of the invention pertains to a method of manufacturing a stator 1 of a rotating electric machine according to the foregoing first embodiment. The manufacturing method of this embodiment is described in the following with reference to FIG. 10.

The manufacturing method of the tenth embodiment includes a process of producing coil units 12 and a process of producing linear-shaped stator core 11, wherein these processes are performed in two separate steps. Upon completion of these two processes, the coil units 12 are arranged in line and together fitted into slots 14 in the linear-shaped stator core 11 at one time. Subsequently, the stator core 11 is shaped into a cylindrical form and facing ends of the stator core 11 are joined to each other by welding, for instance.

The stator core 11 is produced by laminating a plurality of stator core segments which are made by punching an electromagnetic steel sheet by a press, for instance. Each of the stator core segments have a linear-shaped back yoke portion and a plurality of tooth portions extending from the back yoke portion at right angles thereto. The stator core segments thus shaped are stacked and joined together by welding, for instance, to produce the linear-shaped stator core 11 which has a linear-shaped back yoke 10 and a plurality of teeth 13.

Each of the coil units 12 is made by winding a conductor 22 in a generally rectangular form, stacking one conductor line on top of another. Two parallel straight portions of each coil unit 12 thus preformed are inserted into two adjacent slots 14 on both sides of one tooth 13 in such a manner that one straight portion of the conductor 22 is laid in an inner layer in the slot 14 on one side of the tooth 13 and the other straight portion of the conductor 22 is laid in an outer layer in the slot 14 on the opposite side of the tooth 13.

Referring to FIG. 10, for example, three adjacent coil units 12A, 12B, 12C are first arranged in such a way that one straight portion of the conductor 22 of the coil unit 12B to be wound on one tooth 13 would be laid in the inner layer in one slot 14A underneath one straight portion of the conductor 22 of the coil unit 12A to be wound on one adjacent tooth 13, and the other straight portion of the conductor 22 of the coil unit 12B would be laid in the outer layer in the adjacent slot 14B on top of one straight portion of the conductor 22 of the coil unit 12C to be wound on the other adjacent tooth 13. Then, the conductors 22 of the coil units 12A, 12B, 12C thus arranged are pushed into the successive slots 14. As the individual coil units 12 are forced into the successive slots 14 with conductor lines to be inserted in the inner and outer layers in each slot 14 overlaid in this fashion, the conductor lines of the coil unit 12A to be laid in the outer layer deform and thrust the conductor lines of the coil unit 12B to be laid in the inner layer into the slot 14A.

Since the process of producing the coil units 12 and the process of producing the stator core 11 are performed in two separate steps as stated above, it is possible to produce the coil units 12 and the stator core 11 at the same time, thereby reducing overall manufacturing time.

Also, since the coil units 12 arranged in line are inserted into the slots 14 in the linear-shaped stator core 11, each slot 14 has a wide opening width so that the coil units 12 made of thicker conductors 22 can be inserted into the slots 14 without causing damage to the coil units 12. This also makes it possible to improve the space factor of windings in the individual slots 14.

In the tenth embodiment described above, the conductor lines of each coil unit 12 to be laid in the outer layer deform the conductor lines of the adjacent coil unit 12 to be laid in the inner layer when the conductor lines of the two adjacent coil units 12 are forced into each slot 14. This arrangement of the tenth embodiment may be so modified as to deform the individual coil units 12 before inserting the coil units 12 into the slots 14 such that the straight portions of any two adjacent coil units 12 to be laid in the same slot 14 would be placed in the inner and outer layers when inserted thereinto.

What is claimed is:

1. A stator of a rotating electric machine, said stator comprising:
   a stator core including a cylinder-shaped back yoke, a plurality of teeth extending radially inward from inside the back yoke and a plurality of slots each formed between any two adjacent teeth; and
   a plurality of coils fitted in the slots such that the individual teeth are concentratedly wound by the coils;
   wherein the individual coils are pre-formed coil units having a common shape, each of the coil units being made by winding a conductor in a generally rectangular form, stacking one conductor line on top of another in a single row, and each of the coil units having two parallel straight portions inserted into the slots on both sides of each tooth; and
   wherein the two parallel straight portions of the conductor of each coil unit are fitted in two adjacent slots in such a way that one straight portion of the conductor is laid in an inner layer in one of the two adjacent slots and the other straight portion of the conductor is laid in an outer layer in the other of the two adjacent slots so that individual conductor lines fitted in each slot are radially stacked one on top of another in a single row as viewed in cross section.

2. The stator of the rotating electric machine according to claim 1, wherein the conductor has flat surfaces so that multiple layers of conductor lines are stacked one on top of another with the flat surfaces of the conductor lines placed face to face with each other.

3. The stator of the rotating electric machine according to claim 1, wherein both outgoing ends of each coil unit are taken out of two adjacent slots at one axial end of the stator core.

4. The stator of the rotating electric machine according to claim 3, wherein one outgoing end of each coil unit is taken out from an innermost layer in one of the two adjacent slots whereas the other outgoing end of the same coil unit is taken out from an outermost layer in the other one of the two adjacent slots.

5. The stator of the rotating electric machine according to claim 3, wherein both outgoing ends of each coil unit are taken out from about the middle of inner and outer layers of each successive slot.

6. The stator of the rotating electric machine according to claim 1, wherein both outgoing ends of each coil unit are taken out of each successive slot from opposite axial ends of the stator core.

7. The stator of the rotating electric machine according to claim 1, wherein the stator core is cut at least along one axial line, forming facing cut surfaces on both cut ends of the stator core, and the facing cut surfaces are joined to each other.

8. The stator of the rotating electric machine according to claim 7, wherein the facing cut surfaces are formed in one of the teeth.

9. The stator of the rotating electric machine according to claim 7, wherein the facing cut surfaces are formed at the bottom of one of the slots.

10. The stator of the rotating electric machine according to claim 7, wherein one of the facing cut surfaces is formed on one side of the back yoke extending sideways from a basal part of one tooth while the other cut surface is formed on the opposite side of the back yoke at a basal part of the adjacent tooth.

* * * * *